Jan. 3, 1967 P. J. VAN HEERDEN 3,296,594

OPTICAL ASSOCIATIVE MEMORY

Filed June 14, 1963 2 Sheets-Sheet 1

INVENTOR.
Pieter J. Van Heerden
BY Brown and Mikulka
and
Robert E. Cook
ATTORNEYS INVENTOR.
Pieter J. Van Heerden

BY

ATTORNEYS

United States Patent Office 3,296,594
Patented Jan. 3, 1967

3,296,594

OPTICAL ASSOCIATIVE MEMORY

Pieter J. Van Heerden, Concord, Mass., assignor to Polaroid Corporation, Cambridge, Mass., a corporation of Delaware Filed June 14, 1963, Ser. No. 288,013
22 Claims. (Cl. 340—172.5)

This invention relates to optical information storage and retrieval and particularly to novel association memory including means for retrieving information stored therein.

The applicant, in an article appearing in Applied Optics, vol. 2, p. 394 (1963), entitled "Theory of Optical Information Storage in Solids," has proposed a three-dimensional optical information storage system adapted to be used as an associative memory, that is, a memory which permits a rapid search for information in the form of an output signal termed as an "instruction" corresponding to a particular input signal termed a "situation," regardless of the ordering of the information. The basis of the associative memory system is an alkali halide crystal with homogeneously distributed color centers (F-centers) which can be differentially bleached by exposure to light. Two types of information and storage retrieval systems have been proposed utilizing a bleachable alkali halide crystal as a memory. In one, the situation is coded as a light modulating element such as a conventional photographic transparency, located at an object plane, and the transparency is illuminated by a first converging light beam, the direct light of which is blocked. The crystal is illuminated by light from the first beam diffracted by the transparency or other object containing the information. A second converging light beam, coherent with the first light beam, is caused to illuminate the crystal simultaneously with light from the first beam, and the second beam is focused at a point near an image plane to illuminate an instruction corresponding to the situation, the instruction being stored, for example, as a transparency at the image plane. A plurality of instructions are recorded at different locations at the image plane, and the second beam is focused to illuminate each instruction simultaneously with illumination of the crystal by the first light beam modulated by the corresponding situation. The first (modulated) and second light beam produce within the crystal a three-dimensional interference pattern, characteristic of each situation, which is recorded by bleaching of the crystal. The situation-instruction pair comprising each bit of information are stored separately, and the memory system is employed by locating an arbitrary situation in the object plane and illuminating it with the first beam to cause a ghost image to appear at the appropriate instruction at the image plane. The location of the ghost image is determined, and the instruction is read out, for example, by focusing a television camera tube at the appropriate location.

In the second type of association memory system proposed, the situation-instruction pair comprising each bit of information are stored simultaneously by illumination of an optical image, such as a transparency in the object plane, by a single converging light beam. To search this memory, the situation is located at the object plane causing a ghost image of the instruction to appear at the image plane where it can be read out directly. However, in this system when two different situations are sufficiently similar, that is, have identical parts, ghost images of two instructions corresponding to the two similar situations may appear and cause confusion.

An object of the invention is to provide a novel and improved optical information storage and retrieval system in the form of an associative memory of the character described in which readout is more direct, rapid and noise-free.

Another object of the invention is to provide an associative memory system in which the situation and instruction comprising each bit of information are stored together in the memory by two coherent light beams and readout is accomplished directly by the same light beams.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

The information storage and retrieval system of the invention comprises an associative memory in which are stored a large number of input-output signals or situation-instruction pairs. For each input signal or situation, there is a corresponding output signal or instruction; and the apparatus automatically and rapidly searches for and produces the appropriate output signal or instruction when a signal or a situation is introduced. The input signals can be in any initial form, e.g., electrical, sonic, optical etc., for which an appropriate transducer is available for converting this signal into an image capable of modulating, as by diffraction, a light beam. Language translating apparatus has been suggested as an example of an application of the information storage and retrieval system of the invention. In such an apparatus, the input signal or situation would be a word or words in one language, and the output signal or instruction would be a translation of the input signal or situation into another language. Even though the input signal may be distored, the apparatus, being capable of making decisions as will appear hereinafter, may be employed to produce one or more outputs depending on the closeness of the resemblance of the input signals, the degree of discrimination being subject to predetermination by the operator. The output signal or instruction may also be in substantially any form for which there is available a transducer responsive to a light beam modulated to carry an optical image, an example of which is a conventional television camera tube.

The memory or information storage component of the system is an alkali halide crystal of the type described in the aforementioned article. This crystal, composed, for example, of potassium bromide, is discolored by uniformly and homogeneously distributed color centers or F-centers which are bleached by light irradiation. In order to store the information in the crystal, the crystal is simultaneously illuminated by two coherent light beams having different directions to form a three-dimensional interference pattern within the crystal, bleaching the crystal in a three-dimensional pattern corresponding to the interference pattern. Information is retrieved from the crystal by illuminating it with one of the beams causing the crystal to generate a strong diffracted plane wave in the original direction of the other beam. A second bleaching of the crystal during readout may be prevented by lowering the temperature of the crystal.

Figure 1:
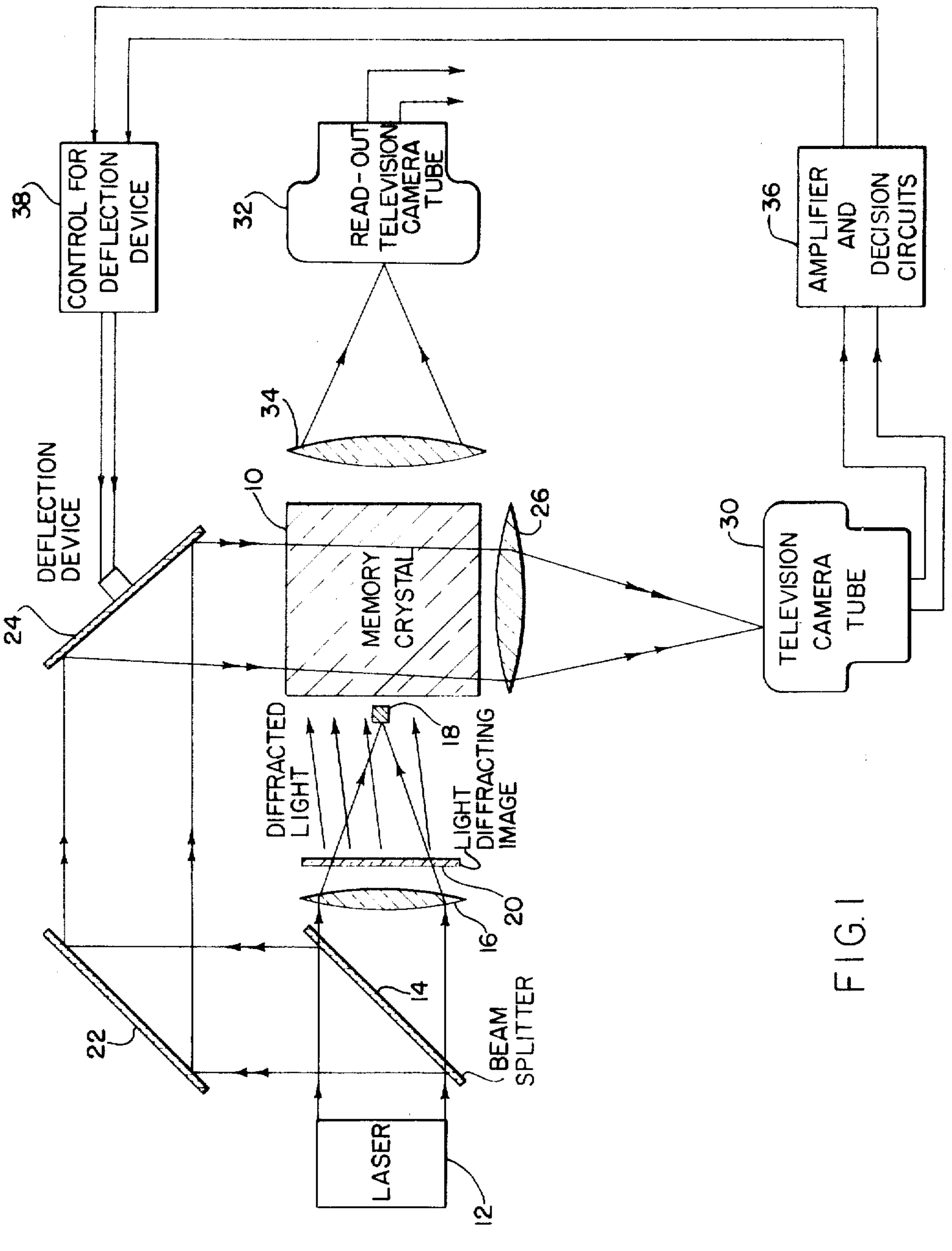
FIGURE 1 is a somewhat schematic view of apparatus embodying the invention.

These phenomena, discussed more fully in the article mentioned, are utilized in the apparatus of the invention shown in FIGURE 1 as comprising a crystal memory of an alkali halide such as potassium bromide having homogeneously distributed F-centers throughout. The crystal is preferably in the shape of a parallelepipedon and has associated with it means (not shown) of a conventional type, e.g., a cryostat, for predeterminedly lowering the temperature of the crystal and maintaining the crystal at a predetermined lowered temperature. The apparatus includes a source of substantially monochromatic coherent light, such as a laser 12, and a beam splitter 14 for separating a light beam from the laser into two directed along divergent paths. The crystal and light source are selected such that the crystal is semi-transparent for light from the source, that is, the crystal absorbs without initially scattering a fraction of the light incident from the source. Other materials in addition to alkali halides may be employed as a memory and include, for example, semi-transparent blocks formed of organic polymers impregnated with so-called "organic" sensitizing dyes bleachable by exposure to light; compounds such as zirconium silicate, calcium fluoride and barium titanate; and compounds such as thallium and silver halide crystals. For a potassium bromide memory crystal, a source of coherent light having a wavelength of the order of 6100 Angstroms is suggested for storing information in the crystal.

A first beam from beam splitter 14 is directed toward crystal 10 through a lens 16 which focuses the first beam at a point just short of the crystal where a member 18 is provided for blocking the direct rays of the beam. The information to be stored in the memory crystal or an arbitrary input signal for initiating a search of the memory crystal is coded as a light deflecting image such as a conventional photographic silver transparency 20 located between lens 16 and member 18 at an object plane. A large part of the illuminating light falling on the transparency (and not blocked by member 18) falls on the crystal, the characteristics of the crystal being such that the transparency is visible without distortion throughout the crystal. The information to be stored as an input-output pair or a situation-instruction pair may, in the case of translating apparatus, take the form of words printed in terms of silver in transparency 20. Simultaneously with the illumination of the crystal with light from the first beam (modulated by the transparency), the crystal is illuminated by a second beam directed toward the crystal by a suitable optical system including, for example, a mirror 22 and a deflection device 24, shown in FIGURE 1, as comprising a mirror. The crystal is allowed to bleach for a predetermined period simultaneously by the refracted light from the transparency containing the input-output pair and the light of the second beam. The amplitudes of the light comprising the second beam and of the light refracted by the transparency is each insufficient by itself to cause bleaching of the crystal, and bleaching occurs in interference patterns produced by the addition of the light amplitudes at various points within the crystal while other portions of the crystal remain substantially unbleached.

During the storage of an input-output pair in the crystal, the second beam is directed by a lens 26 toward a focus at a point on an image plane located in the example shown at the screen of a conventional television camera tube 30. The focal point of the second beam at the image plane is different for each succeeding input-output pair and is varied by a deflection device 24. In order to retrieve information from the memory crystal, a transparency containing only the input signal or situation or a fraction thereof is located in exactly the same position as the input signal or situation during storage and illuminated by the first beam. The bleaching patterns in the crystal will then diffract the light from the transparency in such a way that it appears to come from the source of the second beam and a point "ghost image" will appear at the position on the image plane at which the second beam was focused during storage of the same input signal. Television camera tube 30 converts this ghost point light image into an electrical signal representing the coordinates of position of the point light image at the image surface, and deflection device 24 is then actuated to move the focus of the second beam to the position of the ghost point light image at the image surface. When focus of the second light beam coincides with the ghost point light image at the image plane, then the second beam in turn will be refracted by the bleaching pattern in the crystal such that an exact ghost image of the original transparency appears and can be focused on a second television tube 32 by a lens 34 which receives the image of the output information or instruction and transforms it into an electrical output signal.

During information readout two point light images resulting from the two light beams appear at the image surface, i.e., the screen of television camera tube 30. The apparatus includes means for determining the least bright of these two point light images, i.e., the locus of the ghost point light image and controlling the operation of the deflection device to move the locus of the brighter point light image into coincidence with the less bright (ghost) point light image resulting from light diffracted by the transparency. These means are conventional in nature and include, for example, amplifier and decision circuits 36 for separating the electrical signals produced by television camera tube 30 and representing the two point light images from electrical signals representing noise by rejecting signals having an amplitude below a predetermined level; amplifying the two signals and determining the stronger (or weaker) of the two signals. The deflection device may comprise a mirror movable in two planes and a servomechanism designated in FIGURE 1 as a control 38 for the deflection device operated by the amplifier and decision circuits for moving the brighter point light image into coincidence with the relatively dimmer point light image. Television camera tube 30 together with the amplifier and decision circuits and deflection system constitute a feedback system which can be made to automatically and very rapidly bring the two point light images into coincidence and actuate the readout system including camera tube 32 when this state has been brought about.

It may be likely, particularly when a large amount of information has been stored in the memory crystal, that a plurality of input signals may resemble one another to the extent that more than one (ghost) point light image will appear at the image plane during readout. The brightest of the ghost light point images should correspond to the correct output signal, and all of the other ghost point light images may be said to constitute noise which is rejected by the amplifier and decision circuits 36. The latter are preferably designed so that the discrimination level of the television signal is subject to fine adjustment, particularly if the input signals may be subject to distortion and/or a plurality of similar input signals have been stored. By varying the level of discrimination and/or providing for selective narrow transmission bands, it is also possible to readout several bits of information selectively in response to a single input signal.

The memory crystal is maintained at one temperature during information storage which, in the case of alkali halide crystals, is a temperature at which bleaching occurs and migration of the F-centers does not occur. For a potassium bromide crystal and employing light having a wavelength of 6100 angstroms, minus 140° C. is suggested as a suitable temperature at which to maintain the crystal during readin or storage. During readout further bleaching of the crystal may be prevented by maintaining the crystal at a temperature of the order of minus 200 to minus 220° C. At a temperature of minus 220° C., the crystal will have shrunk approximately 0.3% thereby reducing in size the bleaching interference patterns and making it necessary to employ light of a different wavelength during readout. In the example given, that is, a potassium bromide crystal maintained at a temperature of minus 140° C. during readin by light at a wavelength of 6100 angstroms and maintained at a temperature of minus 220° C. during readout, the wavelength of the readout light should be 6076 angstroms.

Figure 2:
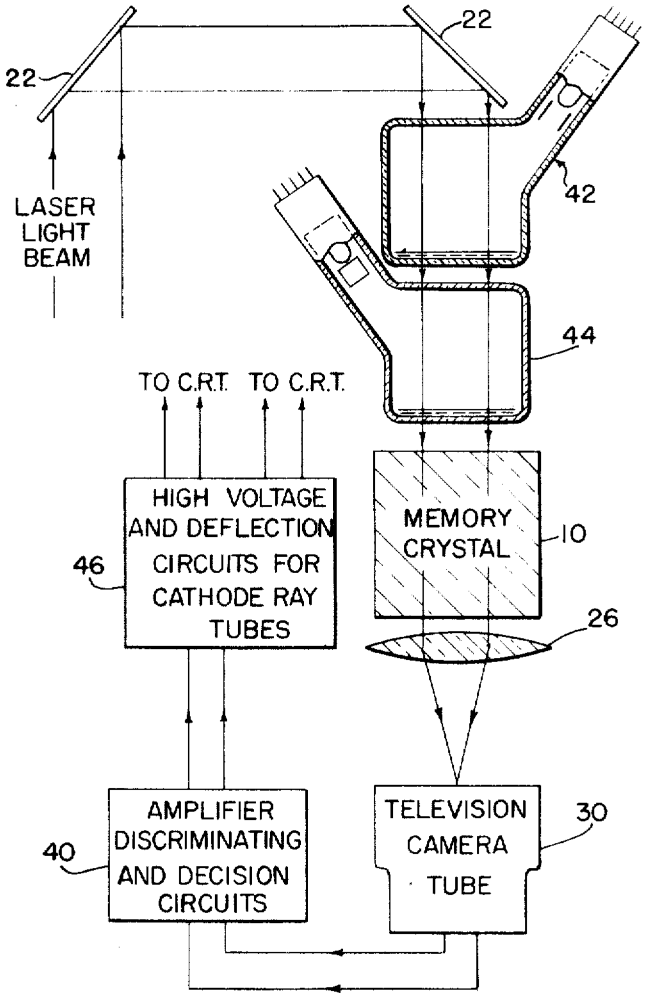
FIGURE 2 is a view similar to FIGURE 1 illustrating another embodiment of components of the apparatus.

The information storage and retrieval rates of the basic system shown in FIGURE 1 may be increased, and the ways in which the system is employed, e.g., as a translating apparatus in which input and output signals are both optical images, or in the nature of a transducer such as photographic type composing apparatus in which the input signal is in a form different from the output signal, may be varied. The readout rate may be increased by providing a readout system which is completely electrical or electronic in construction. Such a system is shown in FIG. 2 and includes a lens 26 for focusing the second beam at an image plane at the screen of television camera tube 30 and amplifier, discriminating and decision circuits 40 similar in construction and operation to amplifier and decision circuits 36. The readout system of FIG. 2 differs from that of FIGURE 1 primarily in the construction and operation of the means for deflecting the second light beam to bring the point image formed thereby into coincidence with the ghost point light image resulting from the first light beam. The deflection means is electronic, and its construction and operation are based on the principle of deflecting the monochromatic coherent light beam with an optical grating. The invention utilizes two gratings in series designed to deflect the beam in mutually perpendicular planes, and the direction and extent of deflection of the beam is controlled by varying the periods of the gratings electronically. The variable periodicity gratings of the invention comprise the screens of a pair of cathode ray tubes 42 and 44 located in the path of the second light beam which is directed by mirrors 22 so as to pass through the two screens toward the memory crystal. The system shown in FIG. 2 includes high voltage and deflection circuits 46 for controlling the cathode ray tubes so as to cause each of the electron beams to write a grating having a period such that the second light beam will be deflected in the direction and to the extent required to bring its focus into coincidence with the ghost point light image at the image plane.

Several expedients are available for writing a grating with an electron beam on a cathode ray tube screen; for example, the operation of the cathode ray tube may utilize the light value or eidophor principle. In such a tube, the screen comprises a thin oil layer and the scanning electron beam deposits a charge which modulates the thickness of the oil layer to cause light illuminating the oil layer to undergo a periodic phase shift. It is a simple matter to control the electron beam so that it writes a phase shift grating of the required period. Another form of variable periodicity grating comprises a "scotophor," that is, a material such as potassium chloride or potassium bromide which is discolored by an electron beam according to the intensity of the beam. A grating written by an electron beam on a cathode ray tube screen comprising a scotophor functions as an absorption grating the period (and resulting deflection) of which can be varied electronically with great rapidity. A phase shift grating can also be written by an electron beam on a screen comprising a polymer in a thermoplastic condition, the thickness of the screen being modulated (as is the eidophor) by the electron beam. The constructions of the electron guns of the cathode ray tubes are simplified by the fact that each cathode ray tube requires only one pair of deflection plates; and the images (gratings) on the cathode ray tube screens can be erased by light, for example, from the second laser light beam itself or from an auxiliary light source. Heating is suggested as another method useful herein for rapidly erasing the gratings.

Storage of information in the memory and search thereof can be hastened by providing an electronic system for producing, in the object plane, an image (instead of a photographic transparency) capable of modulating the first beam from the laser. For this purpose, a cathode ray tube with an eidophor, scotophor or thermoplastic screen such as described may be employed in place of a transparency or similar light-diffracting image. The input cathode ray tube can be coupled with a conventional television camera if the input information is originally in optical form and if otherwise, the cathode ray tube may be coupled with a transducer, e.g., oscilloscope, appropriate for converting the information into electrical signals suitable for operation of the cathode ray tube.

The system of the invention combines advantages of an optical memory, particularly with regard to capacity, with the advantages of an electronic information storage and retrieval system, particularly with regard to the rate at which information storage and retrieval is accomplished. The invention constitutes an associate memory of small size in which a relatively large number of bits of information can be stored while provision is made for search and retrieval in a relatively short time.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. An optical information storage and retrieval system comprising, in combination:

a source of monochromatic, coherent light;

a storage member comprising a crystal of a material semitransparent for light from said source and bleachable by incident light;

means for directing a first beam of light from said source toward said storage member and causing said beam to converge toward a point exterior of said member;

means at said point for absorbing said light;

means including an information-containing, light-diffracting image disposed in the path of said converging first beam;

means for directing a second beam of light coherent with said first beam toward said member in a direction transverse to said first beam to intersect with light from said first beam within said member;

the last-mentioned means including deflection means in the path of said second beam for varying the direction of said second beam with respect to said storage member;

means on the side of said member opposite said deflection means in the path of said second beam for directing said second beam to a focus at a point on a surface, the position of the last-mentioned point on said surface being variable by said deflection means;

means at said surface for sensing the position of a point light image at said surface and causing said deflection means to locate the focus of said second beam at said position on said surface; and means in the path of said first beam to the side of said member opposite said light-diffracting image for sensing a pattern of light representing information derived from said storage member.

2. The information storage and retrieval system of claim 1 in which said means for sensing the position of a point light image at said surface comprises a television camera tube for producing electrical signals representing the position of said point light image and means responsive to said signals for controlling said deflection means.

3. The information storage and retrieval system of claim 2 in which the last-mentioned means include a decision network for determining the position of the brightest of a plurality of point light images at said surface and controlling said deflection means to locate the focus of said second beam at said position of said brightest point light image.

4. The information storage and retrieval system of claim 2 in which said deflection means are movable to change the position of the focus of said second beam and the last-mentioned means responsive to said signal include a mechanism for moving said deflection means.

5. The information storage and retrieval system of claim 4 in which said deflection means comprise a reflecting member movable to shift the location of said focus of said second beam on said surface in mutually perpendicular directions.

6. The information storage and retrieval system of claim 1 in which said means for sensing the position of said point light image at said surface comprise a transducer for producing an electrical signal representing the position of said point light image and said deflection means comprise a variable periodicity optical grating and means responsive to said electrical signals for varying the period of said grating.

7. The information storage and retrieval system of claim 6 in which said transducer is a television picture tube having a photoresponsive target screen at said surface.

8. The information storage and retrieval system of claim 7 in which said deflection means comprise a pair of cathode ray tubes each having a target screen disposed in the path of said second beam, said target screen comprising a material having light transmission properties variable by an electron beam; and means for scanning said electron beam to form an optical grating of said target screen having a period determined to produce the deflection of said second beam in one direction indicated by said electrical signals, said cathode ray tubes being arranged for deflecting said second beam in mutually perpendicular directions corresponding to the scanning directions of said camera tube.

9. The information storage and retrieval system of claim 1 in which said means for sensing the position of said point light image at said surface comprises a transducer for producing electrical signals representing the position of said point light image, and said deflection means comprise a cathode ray tube including a target screen in the path of said second beam and comprising a material having light-transmission properties variable by an electron beam and means for moving said electron beam to form an optical grating of said target screen having a period capable of deflecting said second beam as indicated by said electrical signals.

10. The information storage and retrieval system of claim 9 in which said grating is an absorption grating.

11. The information storage and retrieval system of claim 10 in which said material comprising said target screen is selected from the class consisting of scotophors, having light absorption characteristics which are changed by impingement of an electron beam.

12. The information storage and retrieval system of claim 9 in which said grating causes a periodic phase shift in said second light beam passing through said grating.

13. The information storage and retrieval system of claim 12 in which said target screen comprises a thin film of a fluid having a thickness variable by impingement of an electron beam.

14. In an optical information storage and retrieval system of the character described including a storage member, means for illuminating said storage member with a first light beam to produce a point light image at a surface and means for illuminating said member with a second monochromatic, coherent light beam to derive a light image from said member representing information stored therein as a three-dimensional image of an interference pattern, information retrieval means comprising, in combination:

a first photoresponsive transducer for sensing the position of said point light image at said surface and producing electrical signals representing the position of said point light image;

deflection means in the path of said second beam for varying the direction of said second beam with respect to said storage member;

means on the side of said member opposite said deflection means for directing said second light beam to a focus at said surface;

control means responsive to said electrical signals for causing said deflection means to locate the focus of said second beam at said position on said surface; and a second photoresponsive transducer in the path of said first beam for sensing said light image representing information derived from said storage member.

15. The information storage and retrieval system of claim 14 in which said first photoresponsive transducer includes a television picture tube having a photoresponsive target screen at said surface.

16. The information storage and retrieval system of claim 14 in which said control means include a decision network for determining the position of the brightest of a plurality of said point light images at said surface and causes said deflection means to locate the focus of said second beam at said position of said brightest point light image.

17. The information storage and retrieval system of claim 14 in which said deflection means include a variable periodicity optical grating and means responsive to said electrical signals for varying the period of said grating.

18. The information storage and retrieval system of claim 14 in which said deflection means comprise a cathode ray tube including a target screen positioned in the path of said second beam and comprising a material having light transmission properties variable by an electron beam, and means for moving said electron beam to form an optical grating of said target screen having a period capable of deflecting said second light beam as indicated by said electrical signals.

19. The information storage and retrieval system of claim 18 in which said grating is an absorption grating.

20. The information storage and retrieval system of claim 19 in which said material comprising said target screen is selected from the class consisting of scotophors having light absorption characteristics which are changed by impingement of an electron beam.

21. The information storage and retrieval system of claim 18 in which said grating causes a periodic phase shift in said second light beam passing through said grating.

22. The information storage and retrieval system of claim 21 in which said target screen comprises a thin film of a fluid having a thickness variable by impingement of said electron beam.

References Cited by the Examiner

UNITED STATES PATENTS

| | | | |
|---|---|---|---|
| 2,830,285 | 4/1958 | Davis et al. | 340—174 |
| 2,836,753 | 5/1958 | Hodowanec | 313—92 |
| 3,123,711 | 3/1964 | Fajans | 250—71 |
| 3,144,637 | 8/1964 | Adams et al. | 340—172.5 |
| 3,191,157 | 6/1965 | Parker et al. | 340—173 |
| 3,196,743 | 7/1965 | Dreyer | 88—61 |
| 3,218,390 | 11/1965 | Bramley | 178—7.85 |

ROBERT C. BAILEY, *Primary Examiner.*

R. RICKERT, *Assistant Examiner.*